United States Patent
Turner

(10) Patent No.: US 6,386,575 B1
(45) Date of Patent: May 14, 2002

(54) MOBILE SEAT ARRANGEMENT

(75) Inventor: Steven Turner, Redondo Beach, CA (US)

(73) Assignee: Convaid Products, Inc., Torrance, CA (US)

(*) Notice: Subject to any disclaimer, the term of this patent is extended or adjusted under 35 U.S.C. 154(b) by 0 days.

(21) Appl. No.: 09/636,055

(22) Filed: Aug. 10, 2000

(51) Int. Cl.⁷ .............................. B62B 7/06; B62B 11/00
(52) U.S. Cl. ........................ 280/647; 280/650; 280/657
(58) Field of Search ................................. 280/642, 644, 280/646, 42, 647, 649, 650, 47.34, 47.35, 47.38, 47.4, 47.41, 250.1; 297/326, 327, 328, 377, 42, 45, 55, 58

(56) References Cited

U.S. PATENT DOCUMENTS

| | | | |
|---|---|---|---|
| 3,784,252 A | | 1/1974 | Peterson ..................... 297/364 |
| 4,030,769 A | * | 6/1977 | Peng et al. .................... 280/42 |
| 4,062,555 A | * | 12/1977 | Peng et al. .................... 280/42 |
| 4,094,531 A | | 6/1978 | Cabagnero ................... 280/649 |
| 4,111,454 A | * | 9/1978 | Kassai ......................... 280/649 |
| 4,157,839 A | * | 6/1979 | Lahti et al. .................. 280/642 |
| 4,232,897 A | | 11/1980 | Maclaren et al. ............. 297/364 |
| 4,256,325 A | * | 3/1981 | Fleischer .................... 280/649 |
| 4,266,807 A | * | 5/1981 | Griffin ........................ 280/640 |
| 4,294,464 A | * | 10/1981 | Ettridge ..................... 280/649 |
| 4,324,410 A | * | 4/1982 | Perego ........................ 280/42 |
| 4,335,893 A | | 6/1982 | Carmichael et al. .......... 280/42 |
| 4,335,900 A | * | 6/1982 | Fleischer .................... 280/649 |
| 4,353,577 A | | 10/1982 | Giordani ..................... 280/642 |
| 4,398,748 A | | 8/1983 | Duvignacq ................. 280/644 |
| 4,538,830 A | | 9/1985 | Nakao et al. ................ 280/647 |
| 4,544,178 A | | 10/1985 | Al-Sheikh et al. ........... 280/642 |
| 4,618,184 A | | 10/1986 | Harvey ......................... 297/19 |
| 4,632,420 A | * | 12/1986 | Miyagi ....................... 280/642 |
| 4,648,651 A | * | 3/1987 | Hawkes ........................ 297/45 |
| 4,685,688 A | * | 8/1987 | Edwards ..................... 280/30 |
| 4,697,823 A | * | 10/1987 | Kassai ........................ 280/644 |
| 4,759,566 A | * | 7/1988 | Kassai ........................ 280/642 |
| 4,828,278 A | * | 5/1989 | Shinroku et al. ............ 280/644 |
| 5,123,670 A | * | 6/1992 | Chen .......................... 280/650 |
| 5,192,091 A | * | 3/1993 | Lui ............................. 280/644 |
| 5,240,277 A | * | 8/1993 | Scheulderman ............. 280/650 |
| 5,244,223 A | * | 9/1993 | Uchiyama ................. 280/250.1 |
| 5,421,603 A | * | 6/1995 | Wills et al. .................. 280/642 |
| 5,472,224 A | * | 12/1995 | Cabagnero ................... 280/642 |
| 5,480,177 A | * | 1/1996 | Yoneda ....................... 280/642 |
| 5,562,330 A | * | 10/1996 | Cabagnero ................... 297/42 |
| 5,622,376 A | * | 4/1997 | Shamie ....................... 280/642 |
| 5,641,170 A | | 6/1997 | Helm .......................... 280/30 |
| 5,687,984 A | * | 11/1997 | Samuel ....................... 280/641 |
| 5,752,738 A | * | 5/1998 | Onishi et al. ................. 297/61 |
| 5,755,455 A | * | 5/1998 | Chen et al. .................. 280/642 |
| 5,772,235 A | | 6/1998 | Espenshade ................. 280/643 |
| 5,806,877 A | * | 9/1998 | Huang ........................ 280/642 |
| 5,845,925 A | * | 12/1998 | Huang ........................ 280/642 |
| 5,857,688 A | * | 1/1999 | Swearingen ............... 280/250.1 |
| 5,863,061 A | * | 1/1999 | Ziegler et al. .............. 280/642 |
| 6,099,002 A | * | 8/2000 | Uchiyama ............. 280/87.021 |
| 6,105,997 A | | 8/2000 | Watkins ..................... 280/649 |
| 6,113,128 A | * | 9/2000 | Watkins ..................... 280/647 |

FOREIGN PATENT DOCUMENTS

GB        2 091 179 A    12/1981

* cited by examiner

Primary Examiner—Brian L. Johnson
Assistant Examiner—Bridget Avery
(74) Attorney, Agent, or Firm—Oppenheimer Wolff & Donnelly LLP

(57) ABSTRACT

A mobile seat arrangement is provided which is configured to collapse for ease of storage and transportation. An x-brace, a rear lock brace and a front racking brace help to hold the mobile seat arrangement in an upright position for use as a stroller, wheelchair, or other seating arrangement. The braces also facilitate the collapse of the mobile seat arrangement in a compact fashion. Placement hooks are also provided to place a seat and back portion into the frame of the mobile seat arrangement. The mobile seat arrangement can also be tilted, with the angle between the seat and back of the seat and back portion remaining constant as the frame is tilted for the user. Arm rests and foot rests are also included.

61 Claims, 9 Drawing Sheets

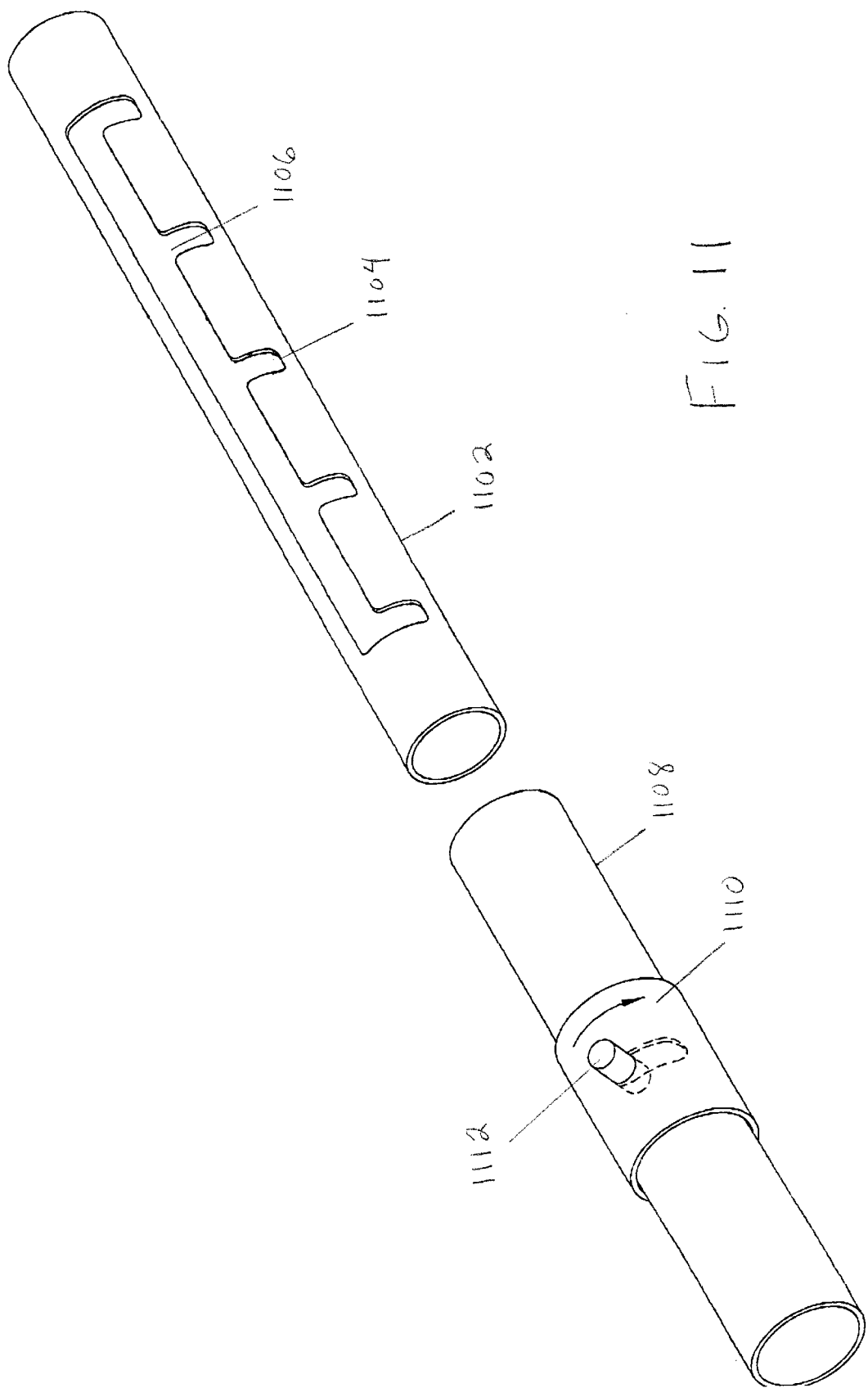

MOBILE SEAT ARRANGEMENT

BACKGROUND OF THE INVENTION

1. Field of the Invention

This invention relates to a mobile seat arrangement. Specifically, the invention is directed to a stroller or a pediatric wheelchair that is collapsible into a compact configuration.

2. Description of the Related Art

Mobile seat arrangements include but are not limited to strollers and wheelchairs. For the purposes of simplicity, the term stroller will be used throughout this specification when referring to the prior art. It is to be understood that the invention relates to folding mobile seat arrangements, of which strollers are an embodiment, and that use of the word stroller is not intended to limit the scope of the invention to strollers.

Prior art strollers have been used for the transport of infants, children, invalids, or anyone suffering from a debilitating disease or condition. Strollers may also be used when a person is too weak to walk or in other similar situations. Often it is desirable to have a foldable stroller to allow for convenient transportation and storage when the stroller is not in use.

Some prior art strollers, when in use, provide only one position for the seat and back relative to the frame of the wheelchair. There are situations where the single position is uncomfortable for the user of the wheelchair. For example, a user seated in the stroller and wishing to sleep may be uncomfortable sitting in an upright position. Further, if the person being so transported in the stroller falls asleep, a more recumbent position may be desired than is provided in the upright seating condition. Additionally, when the stroller is pushed over or down some obstruction, such as a curb or the like, it is desired for both comfort and safety to tilt the seat to compensate for the tilt of the stroller so that the person does not fall from the stroller or undergo the sensation of being about to fall from the stroller. The seat and back support structures must, at all times during use, provide secure seating conditions regardless of the relative movement thereof with respect to the supporting frame. For convenient use, the weight of the entire structure must be kept to a minimum consistent with safety requirements so that it may be easily carried, moved and placed into and removed from a storage location by one person.

Most prior art strollers are also unable to fold into an elongated horizontal structure that is compact and capable of easy storage. Some strollers existing in the art are capable of folding side-to-side. Others are capable of folding front-to-rear. None of the wheelchairs in the art, however, are capable of both a folding motion that is top-to-bottom such that the wheelchair can lie substantially parallel with the ground and a folding motion that is side-to-side.

In U.S. Pat. No. 3,995,882, a folding support structure is disclosed. This invention provides a stroller that is collapsible side-to-side and front-to-rear. This stroller has a pair of elongated frame tubes that are laterally foldable and held together at two spaced points on each of the tubes by front and rear x-braces. However, these x-braces do not permit the collapse of the stroller by lowering it toward the ground in a top-to-bottom manner. The absence of top-to-bottom folding capability limits the convenience and storage of the stroller.

Accordingly, there is a need in the art for a mobile seating arrangement which provides a comfortable seating position and which is capable of being collapsed top-to-bottom and side-to-side for easy transportation and storage.

SUMMARY OF THE INVENTION

The present invention provides a mobile seat arrangement which is laterally foldable in a side-to-side manner and which is also foldable in a top-to-bottom manner. One object of the invention is to provide a stroller that is foldable into a compact configuration for storage and transportation. Another object of the invention is to provide a stroller that presents a comfortable seating position for the user.

The stroller of the present invention is capable of being folded in a top-to-bottom manner. In one embodiment, the stroller includes handle systems that, when activated, allow the frame of the stroller to be lowered. In another embodiment, the lowering of the frame provides a tilted position for the user of the stroller. The stroller can be tilted to any position desired by the user. During the lowering of the stroller, the seat and back parts of the stroller are tilted as a unitary structure such that the angle between them remains constant.

The stroller is also foldable in a side-to-side to manner. In one embodiment, the stroller includes a rear lock brace assembly which is situated between two frame supports. The rear lock brace assembly includes a center hinge mechanism which, when untoggled when the stroller is in a lowered position, causes the frame to collapse in a such a manner that the left and right frame members move inward toward each other.

Additional brace assemblies may also be included to provide support for the stroller and to facilitate the side-to-side collapse of the stroller. These brace assemblies include a racking brace assembly and a bottom x-brace. In another embodiment, the invention also includes a seat and back portion which is removable from the stroller. In this embodiment, the left and right frame members include seat placement hooks, one located on the upper end and one located toward the lower end of each of the frame members. These hooks allow for the removable seat and back portion to be placed onto the frame and held in place.

BRIEF DESCRIPTION OF THE DRAWINGS

FIG. 11 shows a close-up view of the inner member, telescoping tube, and telescoping release mechanism of each frame support.

DETAILED DESCRIPTION OF PREFERRED EMBODIMENTS OF THE INVENTION

Figure 1:
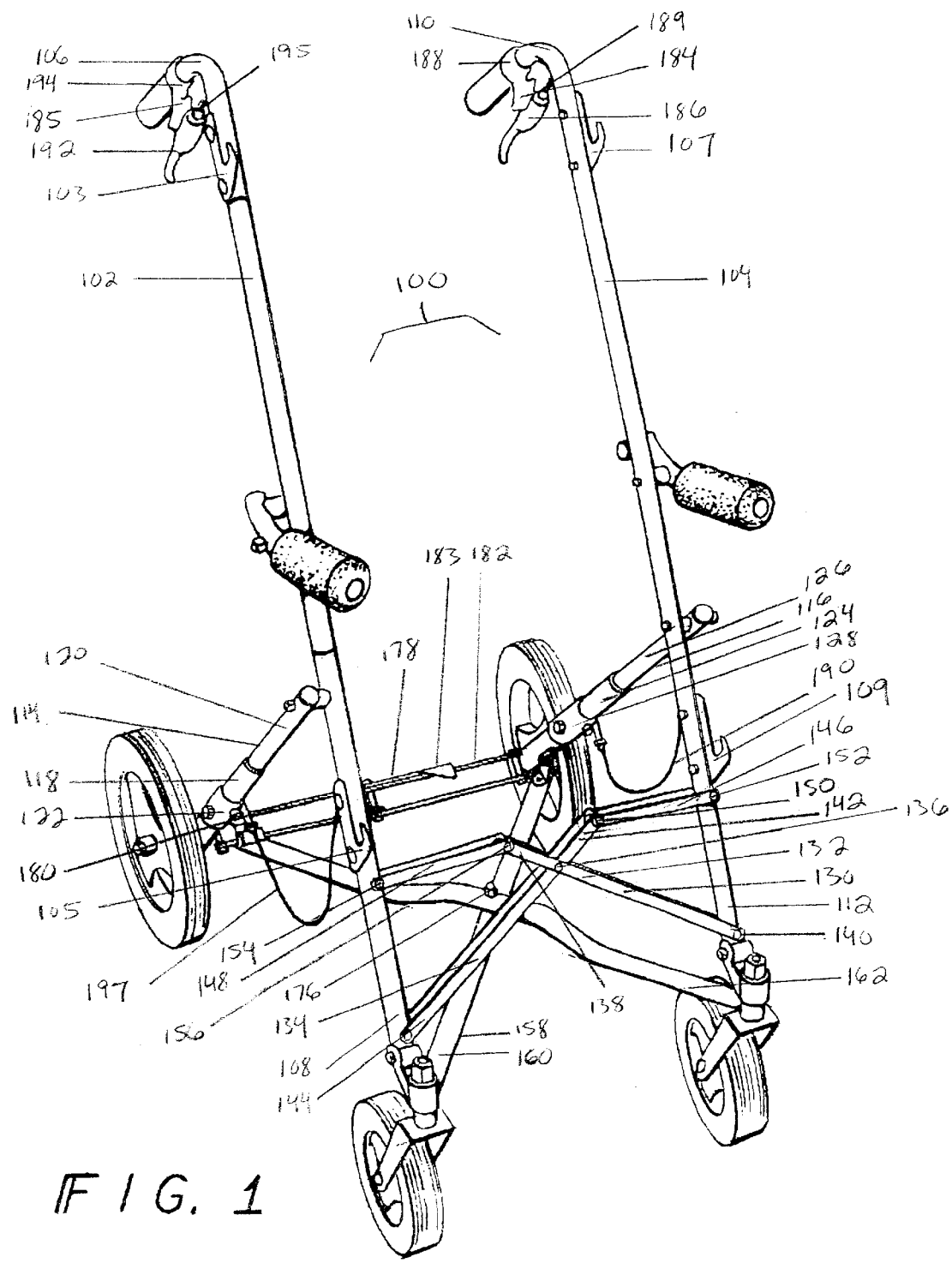
FIG. 1 shows a mobile seat arrangement in its full upright configuration.

FIG. 1 shows a mobile seat arrangement in its upright configuration. The mobile seat arrangement includes a frame 100 having a right frame member 102 and a left frame member 104. The right frame member 102 has an upper end 106 and a lower end 108. The left frame member 104 has an upper end 110 and a lower end 112. The frame 100 also has a right frame support 114 coupled to the right frame member 102 and a left frame support 116 coupled to the left frame member 104. The right frame support 114 has a telescoping tube 118, an inner member 120, and a telescoping release mechanism 122. Similarly, the left frame support 116 has a telescoping tube 124, an inner member 126, and a telescoping release mechanism 128. Each of the left and right frame supports may also have an upper end and a lower end.

Referring further to FIG. 1, a racking brace assembly 130 is shown. The racking brace assembly 130 comprises a first elongated brace member 132 and a second elongated brace member 134. These elongated brace members are coupled together at coupling device 136 to form an X-shaped arrangement. The first elongated brace member 132 has an upper end 138 and a lower end 140. The second elongated brace member 134 also has an upper end 142 and a lower end 144. The racking brace assembly 130 also includes a first short brace member 146 and a second short brace member 148. The first short brace member 146 has a left end 150 and a right end 152. The second short brace member has a left end 154 and a right end 156. The upper end 138 of the first elongated brace member 132 is coupled to the right end of the second short brace member. The upper end 142 of the second elongated brace member 134 is coupled to the left end 156 of the first short brace member 148. The right end of first short brace member and the lower end of the first elongated brace member are coupled to the left frame member 102. The right end of the second short brace member and lower end of the second elongated brace member are coupled to the right frame member 104.

FIG. 1 also shows a bottom x-brace 158. The bottom x-brace 158 comprises a first x-brace member 160 and a second x-brace member 162. The first x-brace member 160 has a center, a front end, and a back end. The second x-brace member 162 also has a center, a front end, and back end. The first and second x-brace members are coupled together by an x-brace coupling mechanism 176. In this embodiment, the x-brace coupling mechanism 176 couples the first x-brace member 160 and the second x-brace member 162 at the centers of the first and second x-brace members, respectively. The front ends of the first and second x-brace members are coupled to the lower ends of the left and right frame members. The back ends of the first and second brace members are coupled to the left and right frame supports.

The mobile seat arrangement of FIG. 1 also includes a rear lock brace assembly 178 positioned between a left frame support 116 and a right frame support 114. The rear lock brace assembly 178 includes a first rear lock brace member 180 and a second rear lock brace member 182. The rear lock brace assembly 178 also includes a center hinge mechanism 183. In its full extended position, the rear lock brace assembly 178 provides stability for the mobile seat arrangement in its full upright use position by bracing the frame 100. The mobile seat arrangement is capable of being collapsed side-to-side by a movement of the center hinge mechanism 183 such that the first and second rear lock brace members are no longer positioned horizontally. Further movement causes the frame to collapse to its eventual side-to-side storage position.

The mobile seat arrangement of FIG. 1 also includes a left handle system 184 coupled to the upper end 110 of the left frame member 104 and a right handle system 185 coupled to the upper end 106 of the right handle system 102. In one embodiment, the upper ends 106 and 110 may be curved. The left handle system 184 includes a left handle lever 186 having a first end and second end, a handle coupling piece 188, and a handle cable 189 having an upper end and a lower end 190. The right handle system 185 similarly includes a right handle lever 192 having a first end and second end, a handle coupling piece 194, and a handle cable 195 having an upper end and a lower end 197.

In one embodiment of this invention, the mobile seat arrangement of FIG. 1, while shown in its upright position, is capable of being collapsed side-to-side and top-to-bottom. Top-to-bottom lowering is triggered by the activation of the handle systems. When the handle levers are depressed, the left and right frame members are able to be lowered. Further top-to-bottom and side-to-side collapse occurs when the center hinge mechanism of the rear lock brace assembly is untoggled. This causes the bottom x-brace and the racking brace assembly to move about their respective coupling points, further lowering the handles, and allowing the left and right frame members to be drawn down and towards each other.

Figure 2:
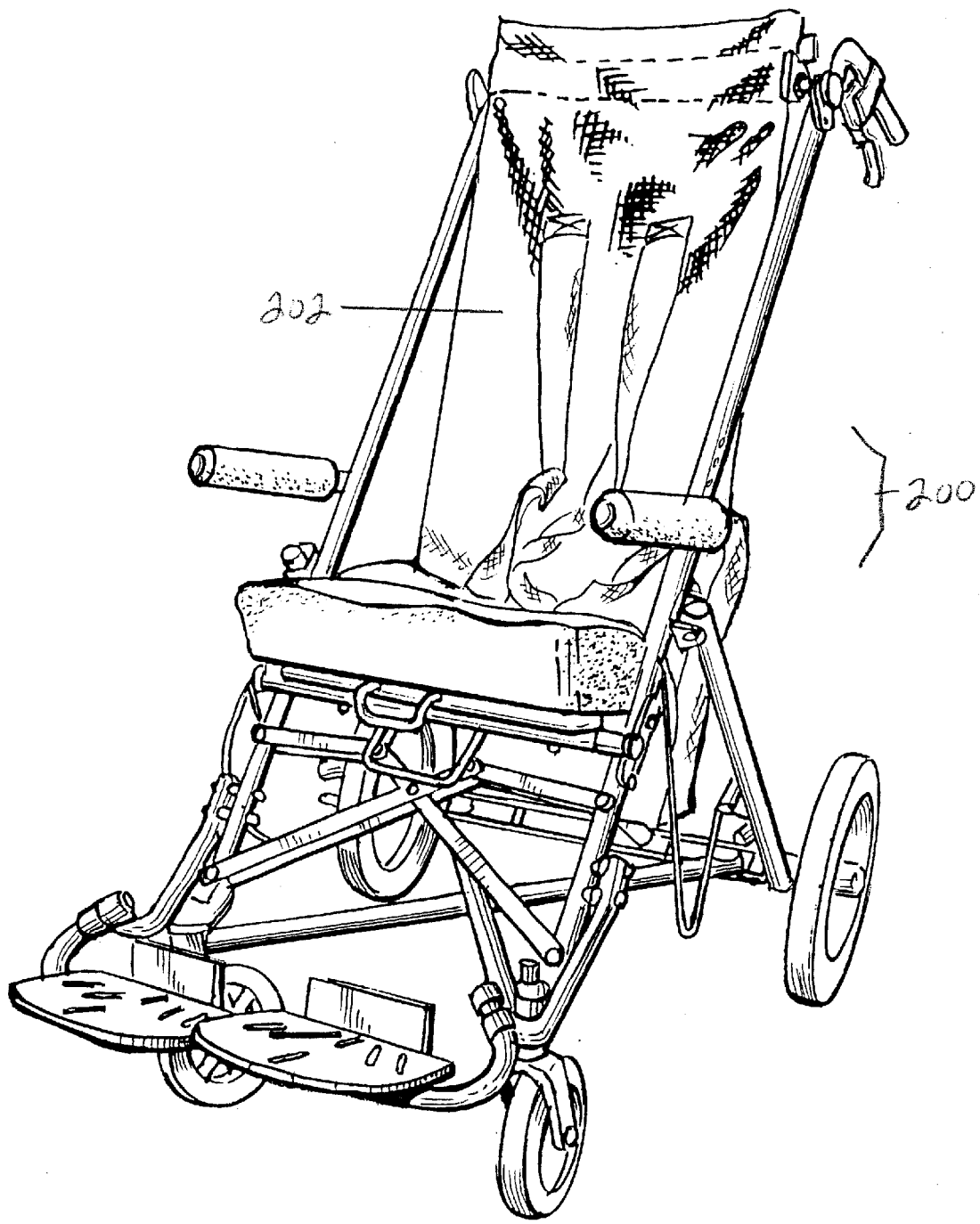
FIG. 2 shows the mobile seat arrangement with a seat and back portion placed onto the frame.

The mobile seat arrangement of FIG. 1 also includes a plurality of seat placement hooks coupled to the right frame member 102 and the left frame member 104. These seat placement hooks include an upper right seat placement hook 103, a lower right scat placement hook 105, a upper left seat placement hook 107, and an lower left seat placement hook 109. In one embodiment, the plurality of seat placement hooks are configured to allow the positioning of a seat and back portion into the frame 100. FIG. 2 shows an example of this embodiment, in which the mobile seat arrangement has a seat and back portion 202 placed in the frame 200. Referring back to FIG. 1, the activation of the left and right handle systems and the lowering of the left and right frame members allows the seat and back portion to be tilted as a unitary structure. As such, the angle between the seat and back is maintained while the left and right frame members are being lowered.

Figure 3:
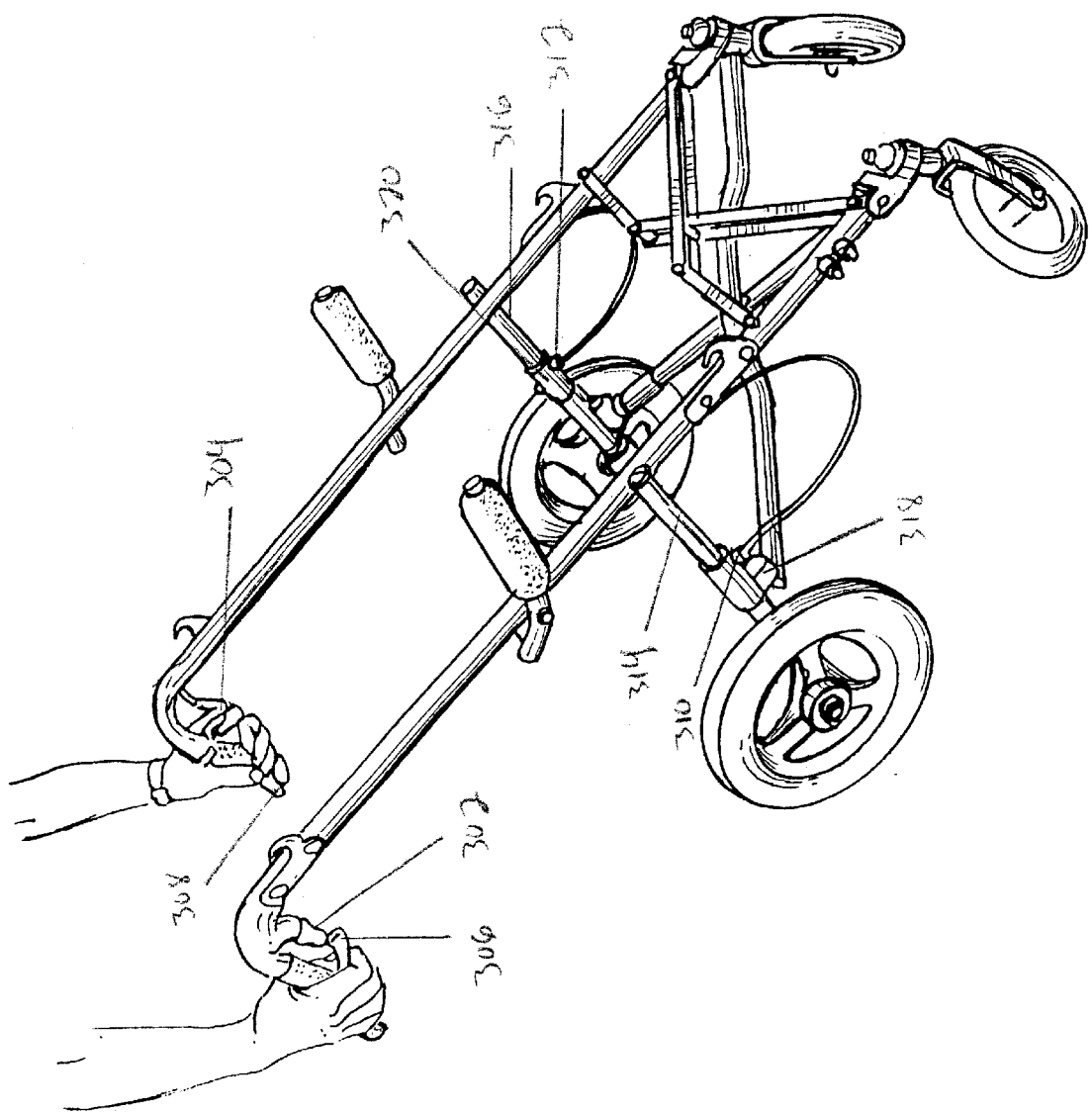
FIG. 3 shows the mobile seat arrangement in a semi-lowered position, angled slightly from its upright configuration.

FIG. 3 shows an arrangement of the invention in which the mobile seat arrangement is in a semi-lowered position. This position is obtained by activating a left handle system 302 and a right handle system 304. The left and right handle systems may be activated by moving a left handle lever 306 and a right handle lever 308 toward the upper ends of the left and right frame members, respectively, thereby depressing the left and right handle levers. The left and right frame members can be lowered while keeping the handle levers depressed. Thus, activating the left and right handle systems triggers the top-to-bottom foldability of the mobile seat arrangement. In one embodiment, the handle levers can be released at any time, thereby allowing a user to set a custom level of tilt for the mobile seat arrangement. The depression of the handle levers causes the telescope release mechanisms 310 and 312, located on the left and right frame supports, to allow the inner members 314 and 316 of the left and right frame supports to slide into the telescope tubes 318 and 320. This occurs simultaneous to the lowering of the left and right frame members. The sliding occurs only as long as the handle levers are depressed.

In one embodiment of the invention, the lowered positions of the mobile seat arrangement may also be locked in place. In this embodiment, a pin is coupled to each telescoping release mechanism. Also, each telescoping tube is coupled to the lower ends of each of the left and right handle cables by the telescoping release mechanism. Each telescoping release mechanism may include a spring load. Additionally, each of the inner members has a series of grooves and a longitudinal slot for placement of the pin. When the left and right handle systems are activated by depressing the handle levers, the telescoping release mechanism on each frame support is rotated against the spring load, allowing the pin to be released from one of the grooves and move into the longitudinal slot. This allows the sliding of the inner member into the telescoping tube when the left and right frame members are being lowered. When the left and right handle levers are released, the spring load of the telescoping release mechanism forces the pin into one of the grooves, locking the mobile seat arrangement into the desired position. Similarly, when the left and right handle systems are activated and the mobile seat arrangement is raised from a lowered position, the telescoping release mechanisms rotate against the spring load, allow the pins to move into the longitudinal slots on each inner member, and cause the inner members to slide out of the telescoping tubes.

Figure 4:
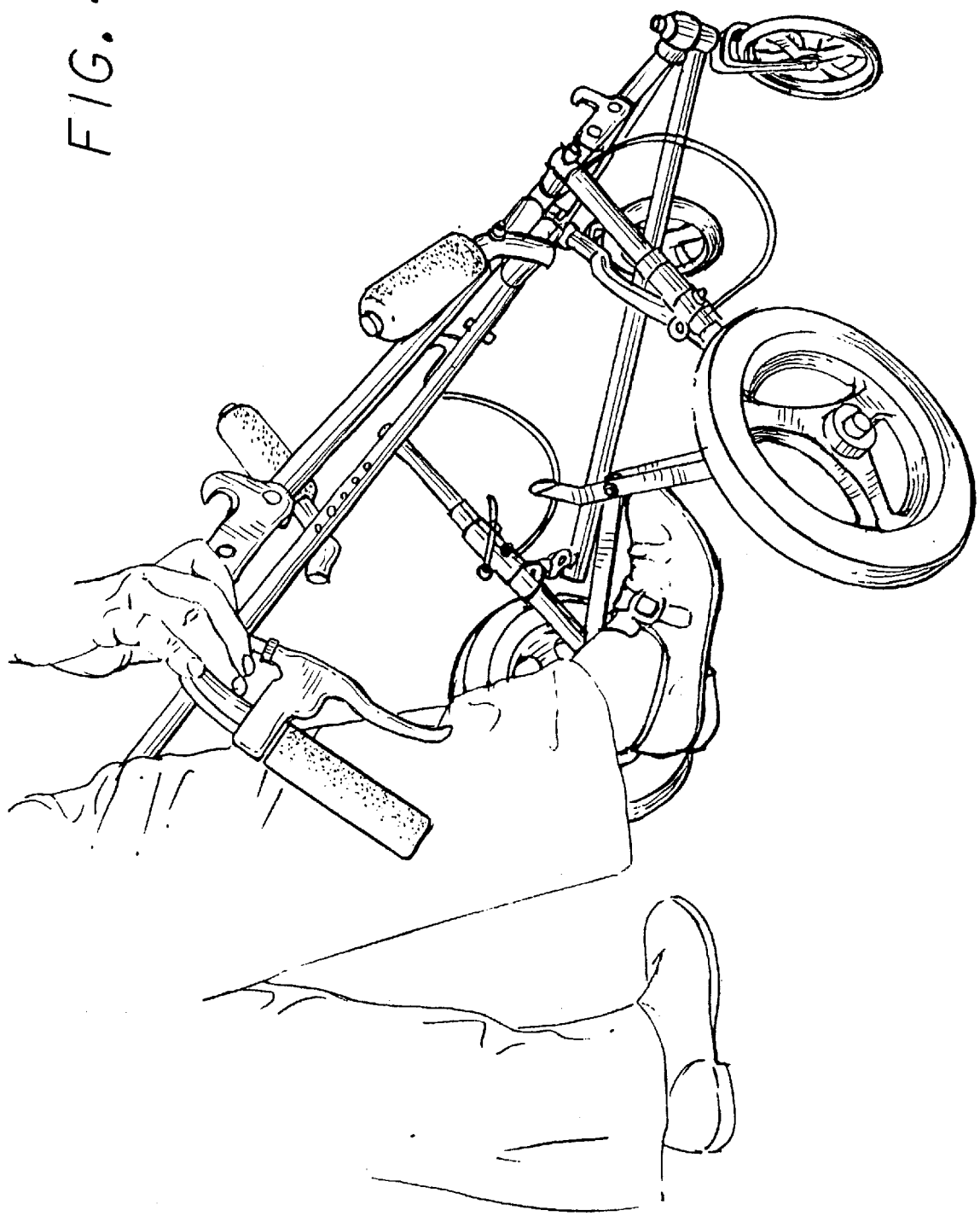
FIG. 4 shows the mobile seat arrangement in a semi-lowered position, angled further from its upright configuration than that shown in FIG. 3.

FIG. 4 shows another seating arrangement of the invention in which the mobile seat arrangement is in a further lowered position from the position shown in FIG. 3. By activating the handle systems and lowering the left and right frame members, the user can set a level of tilt as he or she desires. By depressing the handles together and lowering the left and right frames further, the user can achieve even greater angles of tilt. The arrangements of FIGS. 3 and 4 show examples of levels of tilt in which a person sitting in the stroller can tilt to sleep or rest.

FIG. 4 also shows the movement of the center hinge mechanism of the rear lock brace assembly. By moving the center hinge mechanism, the side-to-side foldability of the stroller can be commenced. The bottom x-brace assembly also begins to collapse, allowing the left and right frame members to come together.

Figure 5:
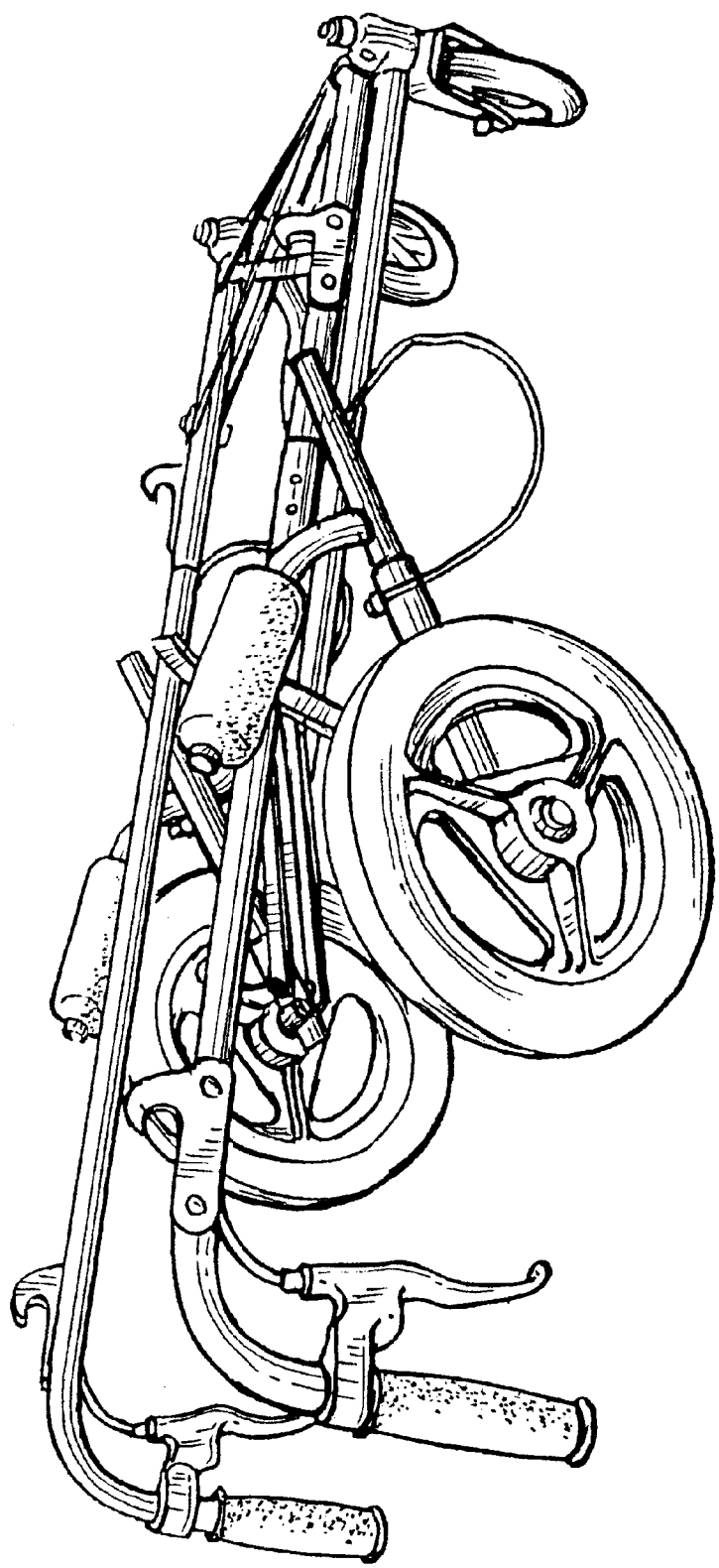
FIG. 5 shows the mobile seat arrangement in its full lowered position.

FIG. 5 shows the mobile seat arrangement in its full lowered and folded position. This position is achieved by activating the left and right handle systems together and lowering the left and right frame members from the original use position. While the left and right frame members are being lowered, the inner members of each of the left and right frame supports slide into the telescoping tubes. The depression of the handle levers causes the telescope release mechanisms to allow the inner members to slide into the telescoping tubes. Also while the left and right frame members are being lowered, the center hinge mechanism of the rear lock brace assembly can be moved forward or untoggled as shown in FIG. 4. Moving the center hinge mechanism further allows the left and right frame members to move toward each other. The side-to-side foldability of the stroller is complete when the center hinge mechanism will move no farther.

Figure 6:
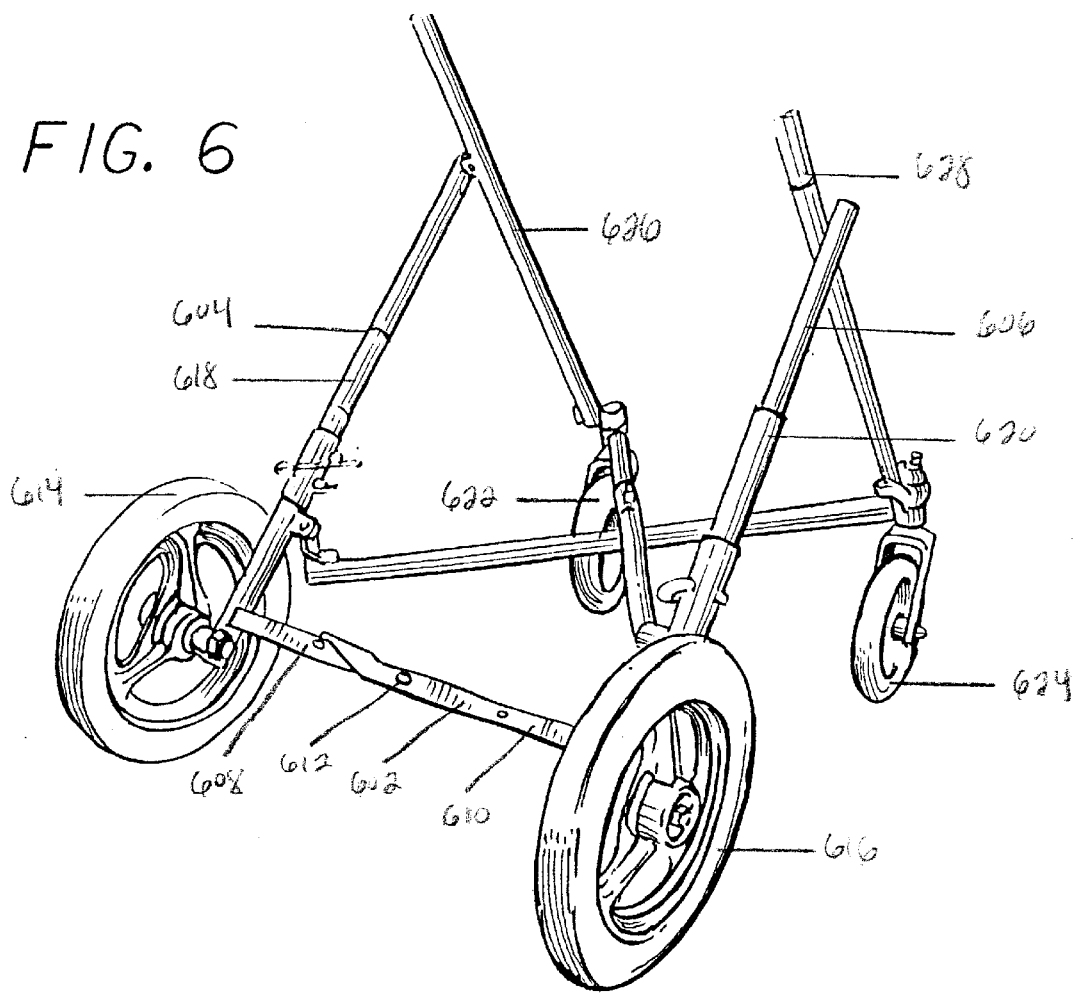
FIG. 6 shows the rear lock brace assembly of the mobile seat arrangement.

FIG. 6 shows the rear lock brace assembly of the mobile seat arrangement. The rear lock brace assembly 602 is positioned between the left frame support 604 and the right frame support 606. The rear lock brace assembly consists of a left lock brace member 608 and a right lock brace member 610. Each lock brace member has a left end and a right end. A center hinge mechanism 612 is located at the right end of the left lock brace member 608 and the left end of the right lock brace member 610 and couples these ends together. In one embodiment, each lock brace member consists of two members, each coupled at one end to the respective frame support and at the other end to the center hinge mechanism 612.

FIG. 6 also shows a plurality of wheels that are included in one embodiment of the invention. A left rear wheel 614 and a right rear wheel 616 are included in the plurality of wheels. The left rear wheel 614 is coupled to the lower end of the left frame support 604. The lower end may be include a telescoping tube 618. The right rear wheel 616 is coupled to the lower end of the right frame support 606. The lower end may include a telescoping tube 620.

Also shown in FIG. 6 are a left front wheel 622 and a right front wheel 624. These may also be included in the plurality of wheels. The left front wheel 622 is coupled to the lower end of the left frame member 626. The right front wheel 624 is coupled to the lower end of the right frame member 628.

Figure 7:
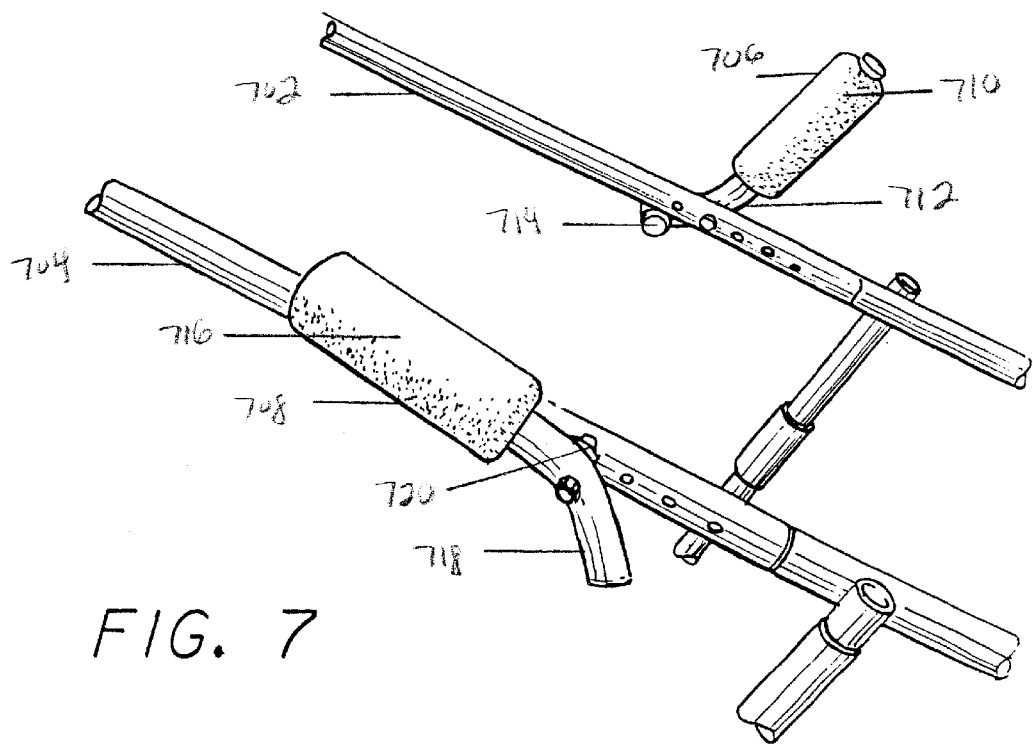
FIG. 7 shows the arm rests of the mobile seat arrangement, with one arm rest in a flat position and one in an upright position.

FIG. 7 shows a close-up view of the left frame member 702 and the right frame member 704 of the mobile seat arrangement. FIG. 7 shows a left arm rest 706 and a right arm rest 708. The left arm rest 706 includes a first arm rest member 710 and a second arm rest member 712. The first arm rest member 710 is coupled to the second arm rest member 712. In one embodiment, the first arm rest member may have a padded surface. The second arm rest member 712 of the left arm rest 706 is coupled to the left frame member 702. The second arm rest member 712 is coupled to allow the left arm rest 706 to be pivotable about the left frame member 702 and angularly positionable relative to the left frame member 702. A coupling piece 714 couples the second arm rest member 712 to the left frame member 702.

The right arm rest 708 is configured in a similar manner. It includes a first arm rest member 716, a second arm rest member 718 coupled to the first arm rest member 716, and coupling piece 720 coupling the second arm rest member to the right frame member such that the second arm rest member is pivotable about the right frame member and angularly positionable relative to the right frame member. In one embodiment, the first arm rest member 716 may have a padded surface.

FIG. 7 shows one embodiment of the arm rests in which one arm rest is angularly positioned relative to the frame. The left arm rest 706 is shown in the regular use position, in a position on which a user sitting in the mobile seat arrangement may place his or her arm for rest. The right arm rest 708 is shown angled upwards from the regular use position. This is shown to indicate one of the possible positions to which the arm rests may be placed.

Figure 8:
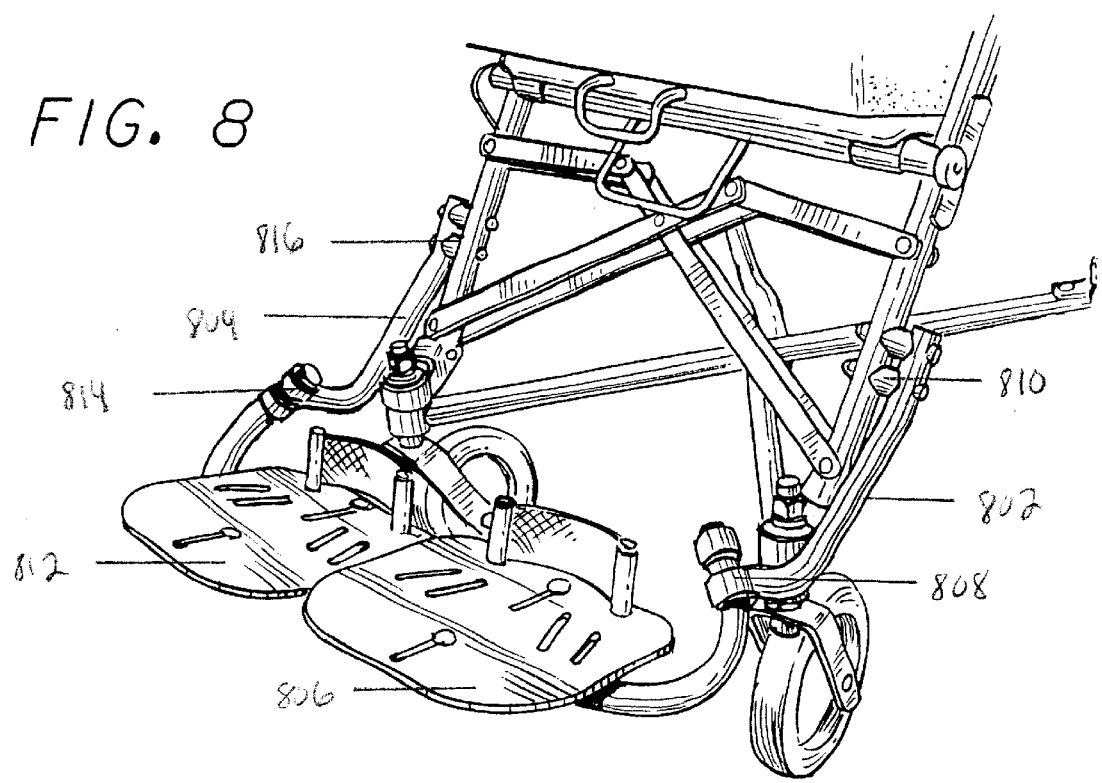
FIG. 8 shows the foot rest assemblies of the mobile seat arrangement in their flat positions.

FIG. 8 shows a left foot assembly 802 and a right foot assembly 804 of the mobile seat arrangement. The left foot assembly 802 includes a foot support 806, a positioning mechanism 808 and a linkage mechanism 810. Similarly, the right foot assembly 804 includes a foot support 812, a positioning mechanism 814, and a linkage mechanism 816. FIG. 8 shows the left and right foot assemblies in their flat positions.

Figure 9:
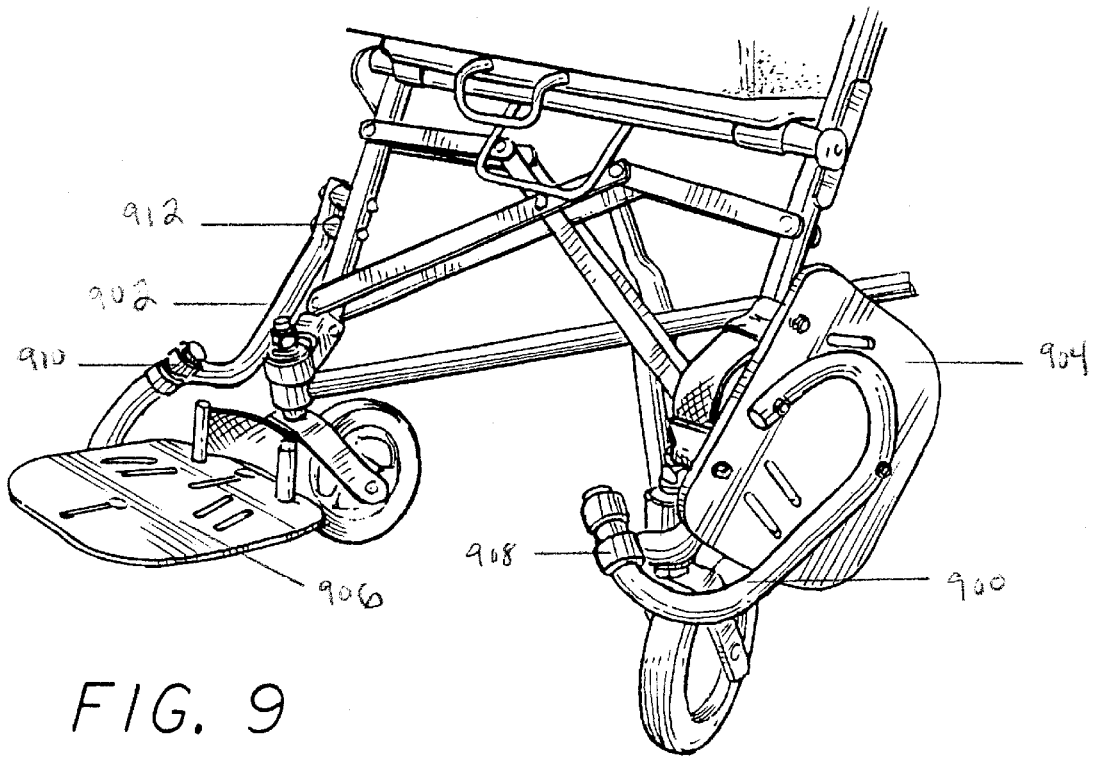
FIG. 9 shows the foot rest assemblies of the mobile seat arrangement, one in a flat position and one in a retracted position.

FIG. 9 also shows the left foot rest assembly 900 and right foot rest assembly 902 of the mobile seat arrangement. In FIG. 9, the left foot rest assembly 900 is shown is its flat position in which a user may rest his or her foot while sitting in the mobile seat arrangement. The right foot rest assembly 902 is shown in an angled position, representing an arrangement of the invention in which the foot rest are capable of being positioned relative to the frame by the user. The left foot rest assembly 900 includes a left foot support 904. The right foot rest assembly 902 includes a right foot support 906.

Referring further to FIG. 9, the left and right foot assemblies also include positioning mechanisms 908 and 910, each of which is coupled to its respective foot support. A left linkage mechanism (not shown) and a right linkage mechanism 912 couple the positioning mechanisms 908 and 910 to the left and right frame members, respectively. The linkage mechanisms 912 and 914 allow the positioning mechanisms 908 and 910 to pivot about their respective frame members. The positioning mechanisms are therefore angularly positionable relative to the frame members. This allows the foot supports 904 and 906 to be moved from a position on which a foot may be placed to a position which is out of the way of the user and any position in between. Positioning the foot supports out of the way of the user's foot allows a user to get into and out of the chair without the foot support being an obstacle.

Figure 10:
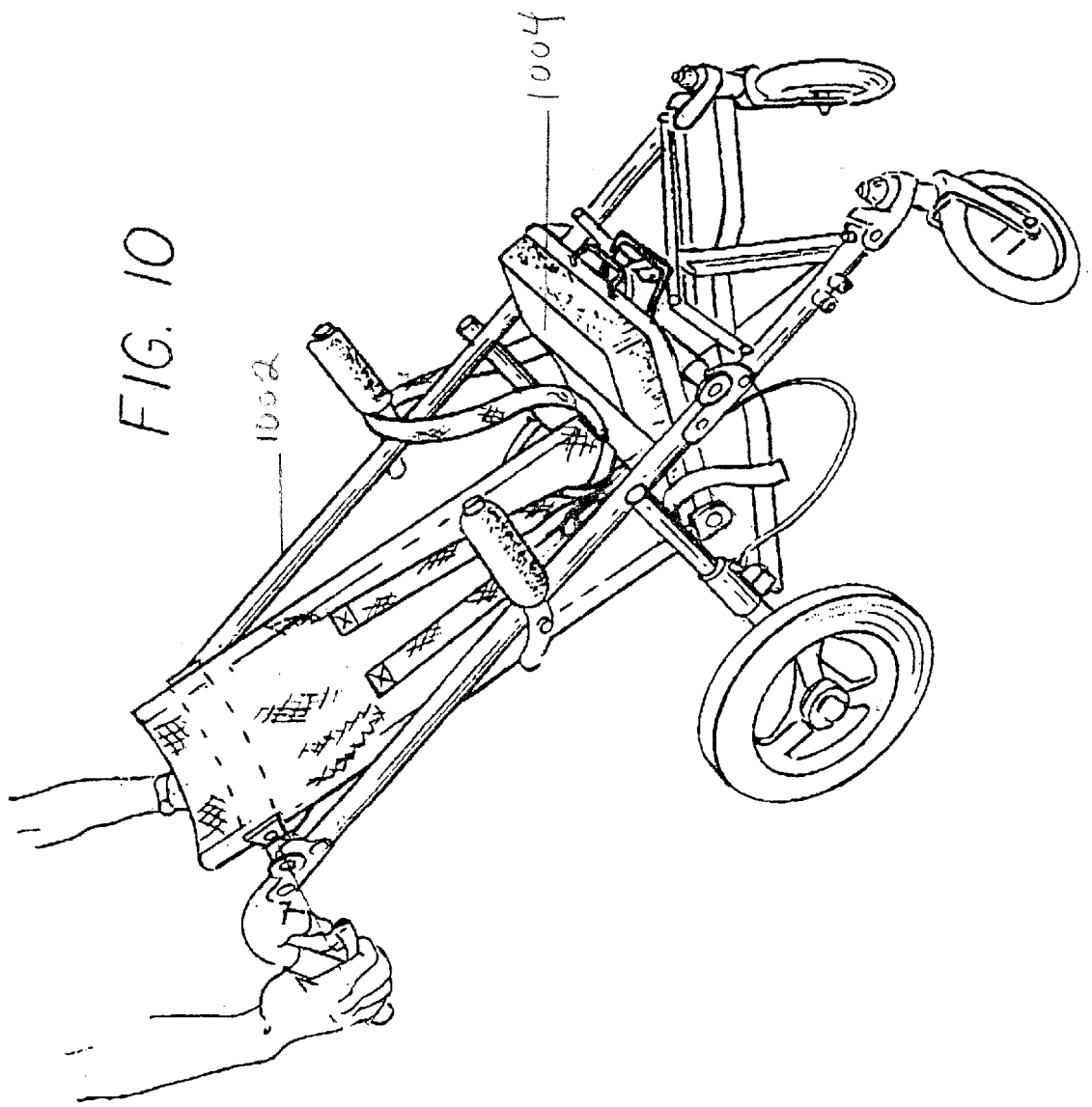
FIG. 10 shows the mobile seat arrangement in a semi-lowered position with a seat and back portion maintained as a unitary structure while being tilted.

FIG. 10 shows the mobile seat arrangement of the invention in a semi-lowered position. A seat and back portion 1002 is included in the mobile seat arrangement and is coupled to the frame 1004. While the mobile seat arrangement is being lowered, the seat and back portion is tilted as a unitary structure. As such, the angle between the seat and back is maintained at the same angle as in the upright position. Thus the angle between the seat and back does not change, regardless of whether the mobile seat arrangement is in the upright position or is being tilted.

FIG. 11 shows a close-up view of an inner member and telescoping tube of the mobile seat arrangement. The inner member 1102 includes a series of grooves 1104 and a longitudinal slot 1106. Also shown is the telescoping tube 1108 and a telescoping release mechanism 1110. The inner member 1102 is configured to slide into and out of the telescoping tube 1108. The telescoping release mechanism 1110 may also include a pin 1112 coupled to the telescoping release mechanism 1110. In a further embodiment, the pin 1112 may also be coupled to a handle cable, which is not shown.

The foregoing description of the embodiments of the invention have been presented for the purposes of illustration and description. It is not intended to be exhaustive or to limit the invention to the precise form disclosed. Although the present invention has been described in detail, it should be apparent to those skilled in the art that various adaptations may be accomplished without departing from the spirit and scope of the invention. Many modifications and variations are possible in light of the above teaching. It is intended that the scope of the invention be limited not by this detailed description, but rather by the claims appended hereto.

What is claimed is:

1. A mobile seat arrangement, comprising:
    a frame, said frame having:
        a left frame member having an upper end and a lower end;
        a right frame member having an upper end and lower end;
        a left frame support coupled to said left frame member, said left frame support having a telescoping tube, an inner member and a telescoping release mechanism; and
        a right frame support coupled to said right frame member, said right frame support having a telescoping tube, an inner member and a telescoping release mechanism;
    a seat and back portion;
    a bottom x-brace;
    a racking brace assembly including:
        a first elongated brace member having an upper end and a lower end;
        a second elongated brace member having an upper end and a lower end;
        a coupling device hingeably coupling said first and second brace members together to forms an X shape;
        a first short brace member having a left end and a right end, the left end hingeably coupled to the upper end of the first elongated brace member and the right end hingeably coupled to the right frame member; and
        a second short brace member having a left end and a Tight end, the right end hingeably coupled to the upper end of the second elongated brace member and the left end hingeably coupled to the left frame member;
    a rear lock brace assembly, positioned between said right frame support and said left frame support, said rear lock brace assembly having a center hinge mechanism; and
    a left handle system coupled to the upper end of said left frame member and a right handle system coupled to the upper end of said right frame member,
    wherein activating the left and right handle systems allows the seat and back portion to tilt as a unitary structure between an upright position and a recumbent position,
    wherein the mobile seat arrangement is configured to collapse top-to-bottom by activating the left and right handle systems and lowering the left and night frame members, and
    wherein the mobile seat arrangement is further configured to collapse side-to-side by moving the center hinge mechanism of the rear lock brace assembly.

2. The mobile seat arrangement of claim 1, further comprising a left foot assembly coupled to the lower end of the left frame member and a right foot assembly coupled to the lower end of the right frame member.

3. The mobile seat arrangement of claim 2, wherein each of said foot assemblies includes:
    a foot support upon which a user's foot may rest;
    a positioning mechanism coupled to said foot support; and
    a linkage mechanism coupled between said positioning mechanism and said respective frame member and pivotable about said frame member, the linkage mechanism allowing said foot support rest to be angularly positionable relative to said frame member.

4. The mobile seat arrangement of claim 1, further comprising a left arm rest coupled to the left frame member and a right arm rest coupled to the right frame member.

5. The mobile seat arrangement of claim 4, the left arm rest and the right arm rest each comprising:
    a first arm rest member;
    a second arm rest member coupled to the first arm rest member; and
    a coupling piece, said coupling piece for coupling the second arm rest member to the respective frame member, the second arm rest member being pivotable about said frame and angularly positionable about said respective frame member.

6. The mobile seat arrangement of claim 1, further comprising a plurality of wheels.

7. The mobile seat arrangement of claim 6, the plurality of wheels including:
   a left front wheel coupled to the lower end of the left frame member;
   a right front wheel coupled to the lower end of the right frame member;
   a left rear wheel coupled to the left frame support; and
   a right rear wheel coupled to the right frame support.

8. The mobile seat arrangement of claim 1, wherein the rear lock brace assembly further comprises a first rear lock brace member and a second rear lock brace member, the first and second rear lock brace members each being coupled to the center hinge mechanism.

9. The mobile seat arrangement of claim 8, wherein the frame is collapsible side-to-side by moving the center hinge mechanism, such that the first and second members move from a perpendicular relationship with the left and right frame supports to an angled relationship.

10. The mobile seat arrangement of claim 1, the bottom x-brace comprising:
    a first x-brace member having a center, a front end, and a back end, the front end being coupled to the lower end of the left frame member, and the back end being coupled to the right frame support,
    a second x-brace member having a center, a front end and a back end, the front end being coupled to the lower end of the right frame member, and the back end being coupled to the left frame support; and
    an x-brace coupling mechanism, said x-brace coupling mechanism configured to couple the first and second brace members together at their respective centers.

11. The mobile seat arrangement of claim 1, the left and right frame members each having top and bottom seat placement hooks.

12. The mobile seat arrangement of claim 11, wherein said seat placement hooks are configured to receive portions of a seat and back portion by placing the seat and back portion into said seat placement hooks.

13. The mobile seat arrangement of claim 1, the left and right handle systems each comprising:
    a handle lever having a first end and a second end;
    a handle coupling piece, said coupling piece coupling the handle lever to the respective frame member, wherein the handle lever is joined at one end to the coupling piece and is configured to move in a downward-upward manner relative to the upper end of the respective frame member, and
    a handle cable having an upper end and a lower end.

14. The mobile seat arrangement of claim 13, wherein the lower ends of the handle cables are coupled to the telescoping release mechanisms of the respective frame supports, the telescoping release mechanisms configured to allow the inner members to slide into the telescoping tubes when the handle levers are depressed and the left and right frame members are lowered.

15. The mobile seat arrangement of claim 14, wherein each telescope release mechanism comprises a pin and a spring load.

16. The mobile seat arrangement of claim 15, wherein each inner member comprises a plurality of grooves and a longitudinal slot.

17. A mobile seat arrangement, comprising:
    a frame, said frame having:
      a left frame member having an upper end and a lower end;
      a night frame member having an upper end and a lower end;
      a left frame support coupled to said left frame member; and
      a right frame support coupled to said night frame member;
    a handle system including a left handle arrangement coupled to the upper end of the left frame member and a night handle arrangement coupled to the upper end of the right fame member, the left and right handle arrangements each comprising a handle lever having a first end and a second end, and a handle coupling piece for coupling the handle lever to the respective frame member, wherein the handle lever is joined at one end to the coupling piece and is configured to move in a downward-upward manner relative to the upper end of the respective frame member, and a handle cable having an upper end and a lower end; and
    a plurality of brace assemblies, the brace assemblies configured to:
      collapse said left frame member and said right frame member together side-to-side, wherein said left frame member lies substantially adjacent to said night frame member; and
      collapse said left frame member and said right frame member top-to-bottom, wherein said left frame member and said right frame member are able to be lowered from an upright position when a handle system coupled to said frame is activated.

18. The mobile seat arrangement of claim 17, wherein the plurality of brace assemblies includes a racking brace assembly.

19. The mobile seat arrangement of claim 18, wherein the racking brace assembly comprises:
    a first elongated brace member having an upper end and a lower end;
    a second elongated brace member having an upper end and a lower end;
    a coupling device hingeably coupling said first and second brace members together to form an X shape;
    a first short brace member having a left end and a right end, the left end hingeably coupled to the upper end of the first elongated brace member and the right end hingeably coupled to the right frame member; and
    a second short brace member having a left end and a right end, the right end hingeably coupled to the upper end of the second elongated brace member and the left end hingeably coupled to the left frame member.

20. The mobile seat arrangement of claim 17, wherein the left and right frame supports each comprise:
    a telescoping tube;
    an inner member; and
    a telescoping release mechanism.

21. The mobile seat arrangement of claim 17, wherein the plurality of brace assemblies includes a bottom x-brace.

22. The mobile seat arrangement of claim 21, the bottom x-brace comprising:
    a first x-brace member having a center, a front end, and a back end, the front end being coupled to the lower end of the left frame member, and the back end being coupled to the night frame support;
    a second x-brace member having a center, a front end and a back end, the front end being coupled to the lower end of the right frame member, and the back end being coupled to the left frame support; and an x-brace coupling mechanism, said x-brace coupling mechanism configured to couple the first and second brace members together at their respective centers.

23. The mobile seat arrangement of claim 17, the left and night frame members having top and bottom seat placement books, said seat placement hooks configured to receive a seat and back portion by placing the seat and back portion into said seat placement hooks.

24. The mobile seat arrangement of claim 17, wherein the plurality of brace assemblies includes a rear lock brace assembly.

25. The mobile seat arrangement of claim 24, wherein the rear lock brace assembly is positioned between said right frame support and said left frame support, said rear lock brace assembly including:

a first rear lock brace member;

a second rear lock brace member, and a center hinge mechanism, the first and second rear lock brace members being coupled to the center hinge mechanism.

26. The mobile seat arrangement of claim 17, further comprising a left foot assembly coupled to the lower end of the left frame member and a right foot assembly coupled to the lower end of the right frame member.

27. The mobile seat arrangement of claim 26, wherein each of said foot assemblies includes:

a foot support upon which a user's foot may rest;

a positioning mechanism coupled to said foot support; and a linkage mechanism coupled between said positioning mechanism and said respective frame member and pivotable about said frame member, the linkage mechanism allowing said foot support rest to be angularly positionable relative to said frame member.

28. The mobile seat arrangement of claim 17, further comprising a left arm rest coupled to the left frame member and a right arm rest coupled to the right frame member.

29. The mobile seat arrangement of claim 28, the left arm rest and the right arm rest each comprising:

a first arm rest member;

a second arm rest member coupled to the first arm rest member; and a coupling piece, said coupling piece for coupling the second arm rest member to the respective frame member, the second arm rest member being pivotable about said frame and angularly positionable about said respective frame member.

30. The mobile seat arrangement of claim 17, further comprising a plurality of wheels.

31. The mobile seat arrangement of claim 30, the plurality of wheels including:

a left front wheel coupled to the lower end of the left frame member;

a right front wheel coupled to the lower end of the Tight frame member;

a left rear wheel coupled to the left frame support; and a right rear wheel coupled to the right frame support.

32. The mobile seat arrangement of claim 20, wherein the lower ends of the handle cables are coupled to the telescoping release mechanisms of the respective frame supports, the telescoping release mechanisms configured to allow the inner members to slide into the telescoping tubes when the handle levers are depressed and the left and right frame members are lowered.

33. The mobile seat arrangement of claim 32, wherein each telescope release mechanism comprises a pin and a spring load.

34. The mobile seat arrangement of claim 33, wherein each inner member comprises a plurality of grooves and a longitudinal slot.

35. The mobile seat arrangement of claim 32, wherein activating the left and right handle arrangements allows a scat and back portion, placed onto the frame, to tilt as a unitary structure between an upright position and a recumbent position.

36. A mobile seat arrangement, comprising:

a frame, said frame having:

a seat and back portion;

a left frame member;

a right frame member;

a left frame support; and a right frame support;

a racking brace assembly positioned between the left and right frame members;

a rear lock brace assembly positioned between the left and right supports;

a bottom x-brace; and a pair of handle systems, wherein activating the left and night handle systems allows the seat and back portion to tilt as a unitary structure between an upright position and a recumbent position, and wherein the mobile seat arrangement is configured to collapse top-to-bottom by activating the handle systems and lowering the left and right frame members, and wherein the mobile seat arrangement is further configured to collapse side-to-side by moving the rear lock brace assembly.

37. A method of folding a mobile seat arrangement, comprising:

lowering a frame having a left frame member and a right frame member from an upright position, wherein the left and right frame members are collapsed top-to-bottom by the activation of a left hand system and a right handle system coupled to the frame, and wherein activating the left and right handle systems allows a seat and back portion, placed onto the frame, to tilt as a unitary structure between an upright position and a recumbent position; and collapsing the left and right frame members together side-to-side, wherein the left frame member lies substantially adjacent to said right frame member.

38. A method of tilting a mobile seat arrangement, comprising:

activating a left handle system and a right handle system coupled to a frame, the frame having a left frame member, a right frame member, and a removable seat and back portion, the left handle system being coupled to the left frame member and the right handle system being coupled to the right frame member;

lowering the left and right frame members from an upright position, wherein a seat and back portion coupled to the frame is tilted as a unitary structure between an upright position and a recumbent position;

collapsing said left frame member and said right frame member together side-to-side, wherein said left frame member lies substantially adjacent to said right frame member; and collapsing said left frame member and said right frame member top-to-bottom.

39. A mobile seat arrangement, comprising:
a frame, said frame having:
- a left frame member having an upper end and a lower end;
- a right frame member having an upper end and lower end;
- a left frame support coupled to said left frame member, said left frame support having a telescoping tube, an inner member and a telescoping release mechanism; and
- a right frame support coupled to said night frame member, said right frame support having a telescoping tube, an inner member and a telescoping release mechanism;

a bottom x-brace;
a racking brace assembly including:
- a first elongated brace member having an upper end and a lower end;
- a second elongated brace member having an upper end and a lower end,
- a coupling device hingeably coupling said first and second brace members together to form an X shape;
- a first short brace member having a left end and a right end, the left end hingeably coupled to the upper end of the first elongated brace member and the night end hingeably coupled to the right frame member; and
- a second short brace member having a left end and a right end, the right end hingeably coupled to the upper end of the second elongated brace member and the left end hingeably coupled to the left frame member;

a rear lock brace assembly, positioned between said right frame support and said left frame support, said rear lock brace assembly having a center hinge mechanism; a seat and back portion; and
a left handle system coupled to the upper end of said left frame member and a night handle system coupled to the upper end of said right frame member,
wherein the mobile seat arrangement is configured to collapse top-to-bottom by activating the left aid right handle systems and lowering the left ad right frame members, ad
wherein the mobile seat arrangement is further configured to collapse side-to-side by moving the center hinge mechanism of the rear lock brace assembly, and
wherein activating the left and right handle systems allows the seat and back portion to tilt as a unitary structure between an upright position and a recumbent position.

40. A mobile seat arrangement, comprising:
a frame, said frame having:
- a left frame member having an upper end and a lower end;
- a right frame member having an upper end and lower end;
- a left frame support coupled to said left frame member, said left frame support having a telescoping tube, an inner member and a telescoping release mechanism; and
- a right frame support coupled to said right frame member, said right frame support having a telescoping tube, an inner member and a telescoping release mechanism;

a bottom x-brace;
a racking brace assembly including:
- a first elongated brace member having an upper end and a lower end;
- a second elongated brace member having an upper end and a lower end;
- a coupling device hingeably coupling said first and second brace members together to form an X shape;
- a first short brace member having a left end and a right end, the left end hingeably coupled to the upper end of the first elongated brace member and the right end hingeably coupled to the right frame member, and
- a second short brace member having a left end and a right end, the right end hingeably coupled to the upper end of the second elongated brace member and the left end hingeably coupled to the left frame member;

a rear lock brace assembly, positioned between said right frame support and said left frame support, said rear lock brace assembly having a center hinge mechanism; and
a left handle system coupled to the upper end of said left frame member and a right handle system coupled to the upper end of said right frame member, the left and right handle systems each comprising:
- a handle lever having a first end and a second end;
- a handle coupling piece, said coupling piece coupling the handle lever to the respective frame member, wherein the handle lever is joined at one end to the coupling piece and is configured to move in a downward-upward manner relative to the upper end of the respective frame member, and
- a handle cable having an upper end and a lower end;

wherein the mobile seat arrangement is configured to collapse top-to-bottom by activating the left and night handle systems and lowering the left and right frame members, and
wherein the mobile seat arrangement is further configured to collapse side-to-side by moving the center hinge mechanism of the rear lock brace assembly.

41. The mobile seat arrangement of claim 40, wherein the lower ends of the handle cables are coupled to the telescoping release mechanisms of the respective frame supports, the telescoping release mechanisms configured to allow the inner members to slide into the telescoping tubes when the handle levers are depressed and the left and right frame members are lowered.

42. The mobile scat arrangement of claim 41, wherein each telescope release mechanism comprises a pin and a spring load.

43. The mobile seat arrangement of claim 42, wherein each inner member comprises a plurality of grooves and a longitudinal slot.

44. A method of folding a mobile seat arrangement, comprising:
activating left and right handle systems to allow a seat and back portion, placed onto a frame, to tilt as a unitary structure between an upright position and a recumbent position;
lowering the frame, the frame having a left frame member and a right frame member, from an upright position, so that the left and right frame members are collapsed top-to-bottom; and
collapsing the left and right frame members together side-to-side, so that the left fame member lies substantially adjacent to said right frame member.

45. A method of tilting a mobile seat arrangement, comprising:
activating a left handle system and a right handle system coupled to a frame, the frame having a left frame member, a right frame member, and a removable seat and back portion the left handle system being coupled to the left frame member and the right handle system being coupled to the right frame member;

lowering the left and right frame members from an upright position, wherein a seat and back portion coupled to the frame is tilted as a unitary structure between an upright position and a recumbent position;

collapsing said left frame member and said right frame member together side-to-side, wherein said left frame member lies substantially adjacent to said right frame member; and collapsing said left frame member and said right frame member top-to-bottom.

46. The method of claim 37, further comprising providing a plurality of brace assemblies.

47. The method of claim 46, wherein the plurality of brace assemblies includes a racking brace assembly, the racking brace assembly having:
    a first elongated brace member having an upper end and a lower end;
    a second elongated brace member having an upper end and a lower end;
    a coupling device hingeably coupling said first and second brace members together to form an X shape;
    a first short brace member having a left end and a right end, the left end hingeably coupled to the upper end of the first elongated brace member and the right end hingeably coupled to the right frame member; and
    a second short brace member having a left end and a right end, the right end hingeably coupled to the upper end of the second elongated brace member and the left end hingeably coupled to the left frame member.

48. The method of claim 46, wherein the plurality of brace assemblies includes a bottom x-brace, the bottom x-brace having:
    a first x-brace member having a center, a front end, and a back end, the front end being coupled to the lower end of the left frame member, and the back end being coupled to the right frame support;
    a second x-brace member having a center, a front end and a back end, the front end being coupled to the lower end of the right frame member, and the back end being coupled to the left frame support; and
    an x-brace coupling mechanism, said x-brace coupling mechanism configured to couple the first and second brace members together at their respective centers.

49. The method of claim 46, wherein the plurality of brace assemblies includes a rear lock brace assembly, the rear lock brace assembly positioned between a right frame support and a left frame support of the frame, the rear lock brace assembly including a first rear lock brace member, a second rear lock brace member, and a center hinge mechanism, the first and second rear lock brace members being coupled to the center hinge mechanism.

50. The method of claim 37, further comprising providing top and bottom seat placement hooks on the left and right frame members, said seat placement hooks configured to receive a seat and back portion by placing the seat and back portion into said seat placement hooks.

51. The method of claim 37, further comprising providing a left foot assembly coupled to the lower end of the left frame member and a right foot assembly coupled to the lower end of the right frame member, wherein each of said foot assemblies includes:

a foot support upon which a user's foot may rest;
a positioning mechanism coupled to said foot support; and
a linkage mechanism coupled between said positioning mechanism and said respective frame member and pivotable about said frame member, the linkage mechanism allowing said foot support rest to be angularly positionable relative to said frame member.

52. The method of claim 37, further comprising providing a left arm rest coupled to the left frame member and a right arm rest coupled to the right frame member, the left arm rest and the right arm rest each comprising;
    a first arm rest member;
    a second arm rest member coupled to the first arm rest member; and
    a coupling piece, said coupling piece for coupling the second arm rest member to the respective frame member, the second arm rest member being pivotable about said frame and angularly positionable about said respective frame member.

53. The method of claim 37, further comprising providing a plurality of wheels, the plurality of wheels including:
    a left front wheel coupled to a lower end of the left frame member;
    a right front wheel coupled to a lower end of the right frame member;
    a left rear wheel coupled to a left frame support of the left frame member; and
    a right rear wheel coupled to a right frame support of the right frame member.

54. A mobile seat arrangement, comprising:
    a frame, said frame having;
        a left frame member having an upper end and a lower end;
        a right fame member having an upper end and a lower end;
        a left frame support coupled to said left frame member; and
        a right frame support coupled to said right frame member;
    a left handle system coupled to the upper end of said left frame member and a right handle system coupled to the upper end of said right frame member, wherein activating the left and right handle systems allows a seat and back portion, placed onto the frame, to tilt as a unitary structure between an upright position and a recumbent position; and
    a plurality of brace assemblies, the brace assemblies configured to:
        collapse said left frame member and said right frame member together side-to-side, wherein said left frame member lies substantially adjacent to said right frame member, and
        collapse said left frame member and said right frame member top-to-bottom, wherein said left frame member and said right frame member arc able to be lowered from an upright position when a handle system coupled to said frame is activated.

55. The mobile seat arrangement of claim 54, further comprising top and bottom seat placement hooks on the left and right frame members, said seat placement hooks configured to receive the seat and back portion by placing the seat and back portion into said seat placement hooks.

56. The mobile seat arrangement of claim 54, wherein the plurality of brace assemblies includes a racking brace assembly, the racking brace assembly having:

a first elongated brace member having an upper end and a lower end;

a second elongated brace member having an upper end and a lower end;

a coupling device hingeably coupling said first and second brace members together to form an X shape;

a first short brace member having a left end and a right end, the left end hingeably coupled to the upper end of the first elongated brace member and the right end hingeably coupled to the right frame member; and a second short brace member having a left end and a right end, the right end hingeably coupled to the upper end of the second elongated brace member and the left end hingeably coupled to the left frame member.

57. The mobile seat arrangement of claim 54, wherein the plurality of brace assemblies includes a bottom x-brace, the bottom x-brace having:

a first x-brace member having a center, a front end, and a back end, the front end being coupled to the lower end of the left frame member, and the back end being coupled to the right frame support;

a second x-brace member having a center, a front end and a back end, the front end being coupled to the lower end of the right frame member, and the back end being coupled to the: left frame support; and an x-brace coupling mechanism, said x-brace coupling mechanism configured to couple the first and second brace members together at their respective centers.

58. The mobile seat arrangement of claim 54, wherein the plurality of brace assemblies includes a rear lock brace assembly, the rear lock brace assembly positioned between said right frame support and said left frame support, the rear lock brace assembly including:

a first rear lock brace member;

a second rear lock brace member; and a center hinge mechanism, the first and second rear lock brace members being coupled to the center hinge mechanism.

59. The mobile seat arrangement of claim 54, further comprising a left foot assembly coupled to the lower end of the left frame member and a right foot assembly coupled to the lower end of the right frame member, wherein each of said foot assemblies includes:

a foot support upon which a user's foot may rest;

a positioning mechanism coupled to said foot support; and a linkage mechanism coupled between said positioning mechanism and said respective frame member and pivotable about said frame member, the linkage mechanism allowing said foot support rest to be angularly positionable relative to said frame member.

60. The mobile seat arrangement of claim 54, further comprising a left arm rest coupled to the left frame member and a right arm rest coupled to the right frame member, the left arm rest and the right arm rest each comprising:

a first arm rest member;

a second arm rest member coupled to the first arm rest member; and a coupling piece, said coupling piece for coupling the second arm rest member to the respective frame member, the second arm rest member being pivotable about said frame and angularly positionable about said respective frame member.

61. The mobile seat arrangement of claim 54, further comprising a plurality of wheels, the plurality of wheels including:

a left front wheel coupled to the lower end of the left frame member;

a right front wheel coupled to the lower end of the right frame member;

a left rear wheel coupled to the left frame support; ad a right rear wheel coupled to the right frame support.

\* \* \* \* \*